(12) United States Patent
Floranc et al.

(10) Patent No.: US 11,888,138 B2
(45) Date of Patent: Jan. 30, 2024

(54) MODULAR ASSEMBLY FOR THE CIRCULATION OF A HEAT TRANSFER FLUID IN A MOTOR VEHICLE BATTERY

(71) Applicant: SOGEFI AIR & COOLING, Guyancourt (FR)

(72) Inventors: Alexandre Floranc, Logelsheim (FR); Eric Colin, Ammerschwihr (FR)

(73) Assignee: SOGEFI AIR & COOLING, Guyancourt (FR)

( * ) Notice: Subject to any disclaimer, the term of this patent is extended or adjusted under 35 U.S.C. 154(b) by 576 days.

(21) Appl. No.: 17/251,341

(22) PCT Filed: Jun. 17, 2019

(86) PCT No.: PCT/EP2019/065812
§ 371 (c)(1),
(2) Date: Dec. 11, 2020

(87) PCT Pub. No.: WO2019/243222
PCT Pub. Date: Dec. 26, 2019

(65) Prior Publication Data
US 2021/0257692 A1 Aug. 19, 2021

(30) Foreign Application Priority Data
Jun. 21, 2018 (FR) .................................. 18 55511

(51) Int. Cl.
*H01M 10/6568* (2014.01)
*H01M 10/613* (2014.01)
(Continued)

(52) U.S. Cl.
CPC ......... *H01M 10/6568* (2015.04); *B60L 50/64* (2019.02); *B60L 50/66* (2019.02);
(Continued)

(58) Field of Classification Search
None
See application file for complete search history.

(56) References Cited

U.S. PATENT DOCUMENTS

2017/0047624 A1* 2/2017 Gunna ............. H01M 10/6556

FOREIGN PATENT DOCUMENTS

| CN | 107579307 | 1/2018 |
| DE | 102014106941 | 11/2015 |

(Continued)

OTHER PUBLICATIONS

International Search Report dated Sep. 2, 2019.
Search Report dated Apr. 20, 2020.

*Primary Examiner* — Scott J. Chmielecki
(74) *Attorney, Agent, or Firm* — IPSILON USA, LLP

(57) ABSTRACT

The invention relates to a modular assembly for the circulation of a heat transfer fluid of a motor vehicle battery housed in a casing (1) with a floor having channels receiving said fluid, characterised in that the casing (1) comprises: —a module (3) for inlet and outlet of said fluid via a base module (4), the latter comprising channels facing and sealingly abutting the ends of the channels of said floor, said base modules (4) being attached on the floor, —a plurality of base modules (4) distributed along each of the two faces of the floor and facing with a sealing abutment on the ends of the channels of the floor, and —a plurality of bridges (5) fluidically connecting two adjacent base modules (4) and two base modules (4) situated on the opposite side of the casing (1) so as to form a serpentine-shaped circuit.

10 Claims, 4 Drawing Sheets

(51) Int. Cl.
*H01M 10/625* (2014.01)
*H01M 10/6556* (2014.01)
*B60L 50/60* (2019.01)
*H01M 50/262* (2021.01)
*H01M 50/249* (2021.01)
*B60L 50/64* (2019.01)

(52) U.S. Cl.
CPC ....... *H01M 10/613* (2015.04); *H01M 10/625* (2015.04); *H01M 10/6556* (2015.04); *H01M 50/249* (2021.01); *H01M 50/262* (2021.01); *H01M 2220/20* (2013.01)

(56) References Cited

FOREIGN PATENT DOCUMENTS

| | | | | |
|---|---|---|---|---|
| DE | 102014106941 A1 * | 11/2015 | .............. | B60L 58/26 |
| FR | 2967246 | 5/2012 | | |
| FR | 2967246 A1 * | 5/2012 | ......... | F28D 1/05358 |

* cited by examiner

MODULAR ASSEMBLY FOR THE CIRCULATION OF A HEAT TRANSFER FLUID IN A MOTOR VEHICLE BATTERY

RELATED APPLICATION

This application is a National Phase of PCT/EP2019/065812 filed on Jun. 17, 2019 which claims the benefit of priority from French Patent Application No. 18 55511, filed on Jun. 21, 2018, the entirety of which are incorporated by reference.

FIELD OF THE INVENTION

The present invention relates to the field of autonomous electrical energy sources, in particular those on board motor vehicles, and the subject thereof is a modular assembly for the inlet, circulation and outlet of a cooling fluid in a battery unit for a hybrid or electric motor vehicle having at least one such unit.

DESCRIPTION OF RELATED ART

Hybrid/electric vehicles are equipped with a battery for storing the electrical energy necessary for their operation. The current challenges require the optimization of the design of battery units, also known as "battery packs", in order to draw the best performance therefrom in terms of service life (charge/discharge) and range. The charging time is also a significant factor in the everyday use of these battery packs.

The batteries employed ideally need to operate at temperatures of between 10° C. and 30° C., in particular high-density storage batteries, of the Li-ion or Li-polymer type for example. Too low a temperature has an impact on range and too high a temperature has an impact on the service life of the batteries. It is therefore necessary to regulate the temperature of the batteries to the best possible extent.

In the context of applications on board vehicles, solutions exist that involve batteries cooled by a heat transfer fluid in order to improve exchanges of heat and to increase the effectiveness of the regulation.

Receiving trays are provided for these batteries, which consist of casings in which the battery modules provided by the manufacturer are disposed. These are generally casings with an extruded aluminum floor, as described for example in U.S. Pat. No. 8,790,808. That floor is passed right through by rectilinear channels in which the heat transfer fluid, in particular cooling fluid, circulates.

However, these solutions are not very flexible in terms of installation and make maintenance difficult. This results in a complex construction, formed by the assembly of a large number of parts, requiring the production of numerous leaktight connections during manufacture (the aging of which may be problematic) and forming a bulky, multicomponent structure.

OBJECTS AND SUMMARY

There is therefore a need for a modular assembly or device for the feeding, circulation and collection of the heat transfer fluid, which is arranged at the ends of the channels in the abovementioned extruded floor.

The aim of the present invention is to overcome at least the main limitations mentioned above and to propose such a modular assembly.

To this end, the subject of the invention is a modular assembly for the inlet, circulation and outlet of a heat transfer fluid, in particular a cooling fluid, in a battery unit for a hybrid or electric motor vehicle having at least one such unit, said at least one battery unit being accommodated in a casing having a floor, in particular made of extruded metal, in which mutually parallel and rectilinear channels are arranged that receive said fluid, characterized in that the casing has:
 a module serving as inlet and an identical module serving as outlet for said heat transfer fluid to and from, respectively, the circuit of channels via in each case a base module, each base module comprising a system of substantially rectilinear and parallel channels facing the ends of the channels in said floor, such that the channels of the base module in each case butt in a leaktight manner against said ends, said base modules being fastened to said floor,
 a plurality of base modules distributed along each of the two faces of the floor and facing the ends of the channels in said floor, such that the channels of the base module in each case butt in a leaktight manner against said ends, said base modules being fastened to said floor, and
 a plurality of bridges fluidically connecting two adjacent base modules situated on one and the same side of said floor together and two base modules situated on the opposite side of the casing together with an offset so as to form a U-shaped or serpentine heat transfer fluid circuit between the two opposite faces of said casing, if necessary along the entire length of the latter.

A further subject of the invention is a motor vehicle, in particular an electric or hybrid motor vehicle, characterized in that it comprises at least one abovementioned assembly likewise according to the invention.

BRIEF DESCRIPTION OF THE DRAWINGS

The invention will be understood better by virtue of the following description, which relates to preferred embodiments that are given by way of nonlimiting examples and explained with reference to the appended schematic drawings, in which.

DETAILED DESCRIPTION

Figure 1:
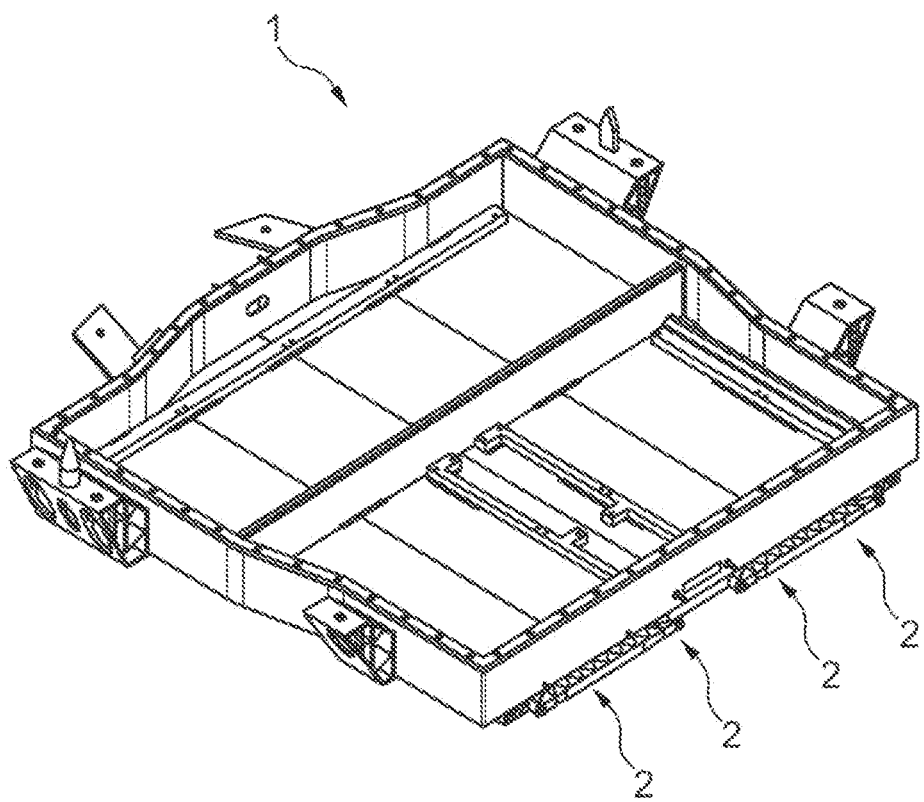
FIG. 1 is a perspective view of a casing intended to receive one or more battery units.
Figure 2:
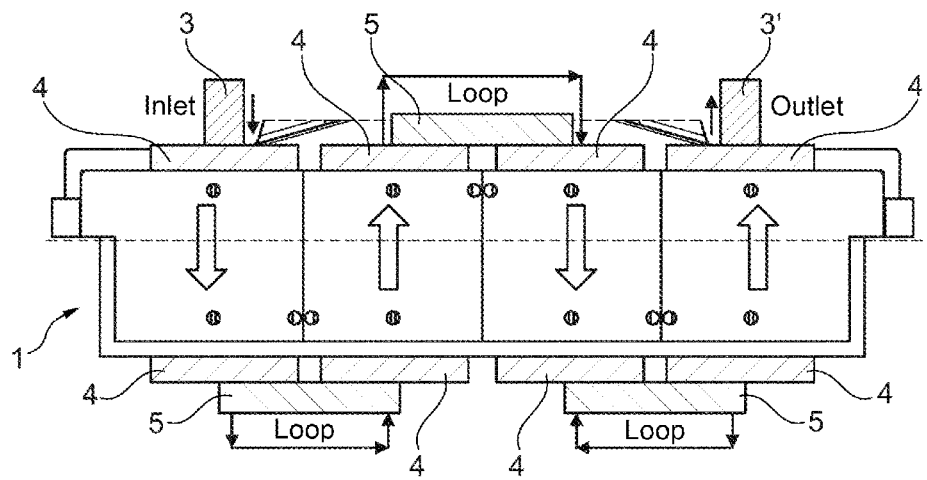
FIG. 2 is a simplified schematic top view of an example of a modular assembly according to the invention (without visible channels)

FIGS. 1 and 2 show a casing 1, in particular for a hybrid and/or electric motor vehicle, intended to receive a plurality of battery cells or elements (not shown), if necessary grouped physically and/or electrically into a plurality of blocks or modules, said casing 1 accommodating and surrounding said cell(s) or element(s) and means for regulating the temperature of said cell(s) or element(s) by circulation of heat transfer fluid in channels 2 (FIG. 1) present in the, in particular extruded, floor of said casing 1.

The casing 1 therefore has, at least in a region of its bottom on which the cells rest, at least one, and preferably a plurality of, zone(s) for heat exchange between said cells and the heat transfer fluid, said zone(s) being incorporated in the structure of said casing 1 in the floor (made for example of extruded metal) of the latter.

Thus, as a result of the incorporation of at least a part of the temperature regulating means in the very structure of the casing 1, a compact structure (maximum interior volume, minimum exterior volume), with a limited number of parts and components to be assembled, is obtained.

In order to make it possible to solve the technical problem set and thus to be able to provide a very large number of solutions, and as illustrated schematically in FIG. 2, the subject of the present invention is a modular assembly for the inlet, circulation and outlet of a heat transfer fluid, in particular a cooling fluid, in a battery unit for a hybrid or electric motor vehicle having at least one such unit, said at least one battery unit being accommodated in a casing 1 having a floor, in particular made of extruded metal, in which mutually parallel and rectilinear channels 2 (not shown) are arranged that receive said fluid, characterized in that the casing 1 has:

- a module 3 serving as inlet and an identical module 3' serving as outlet for said heat transfer fluid to and from, respectively, the circuit of channels 2 via in each case a base module 4, each base module 4 comprising a system of substantially rectilinear and parallel channels facing the ends of the channels 2 in said floor, such that the channels of the base module 4 in each case butt in a leaktight manner against said ends, said base modules 4 being fastened to said floor,
- a plurality of base modules 4 distributed along each of the two faces of the floor and facing the ends of the channels 2 in said floor, such that the channels of the base module 4 in each case butt in a leaktight manner against said ends, said base modules 4 being fastened to said floor, and
- a plurality of bridges 5 fluidically connecting two adjacent base modules 4 situated on one and the same side of said floor together and two base modules 4 situated on the opposite side of the casing 1 together with an offset so as to form a U-shaped or serpentine heat transfer fluid circuit between the two opposite faces of said casing 1, if necessary along the entire length of the latter.

For greater clarity, said channels 2 have not been depicted in FIG. 2. However, arrows have been used to indicate the direction of circulation of the heat transfer fluid between the various elements, in particular through the loops formed by the bridges 5, so as to form, in the nonlimiting example presented in FIG. 2, a serpentine circuit with three U-shaped elbows.

Of course, by varying the number of each of the modules 3, 3', the base modules 4 and the bridges 5, it is possible to create one or more more or less long circuits that are serpentine, U-shaped or inverted U-shaped etc., thereby substantially increasing the number of possibilities and therefore the flexibility of use depending on the other parameters provided by the manufacturers, in particular the suppliers of battery units.

Figure 3:
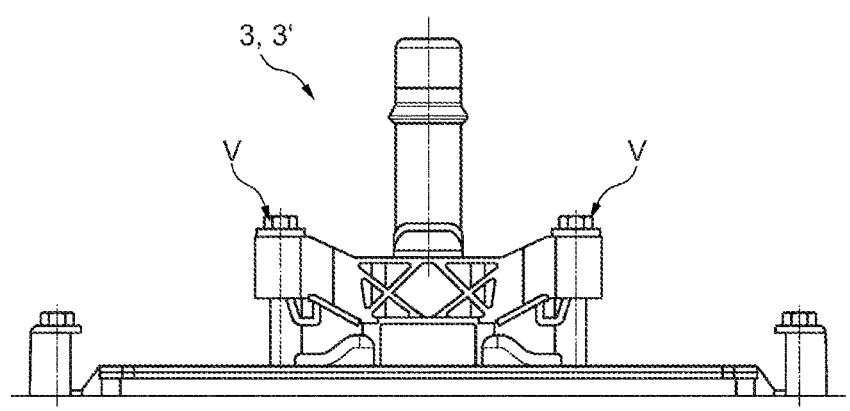
FIG. 3 is a view of the inlet or outlet module of the modular assembly according to the invention.

As can be seen in FIG. 3, the modules 3, 3' serving as inlet and outlet (for the heat transfer fluid) are made in the form of ducts fastened in a leaktight manner by screwing, preferably with the aid of two screws V for each module 3, 3', with fluidic communication to said base modules 4.

According to a particularly preferred embodiment, and as mentioned in FIG. 2 above, the assembly according to the invention is characterized in that it comprises exactly one module 3 serving as inlet and one identical module 3' serving as outlet, and in that these modules 3, 3' are disposed on the same side of the casing 1. Between these two modules 3, 3', it is possible to provide the desired number of base modules 4 and bridges 5.

Advantageously, and as illustrated in FIGS. 4a to 4c and 5 to 7, each base module 4 is made in the form of an elongate bar 6 having at least two, preferably three and even more preferably four channels in leaktight engagement with a corresponding number of channels 2 situated in the floor of said casing 1.

Figure 4A:
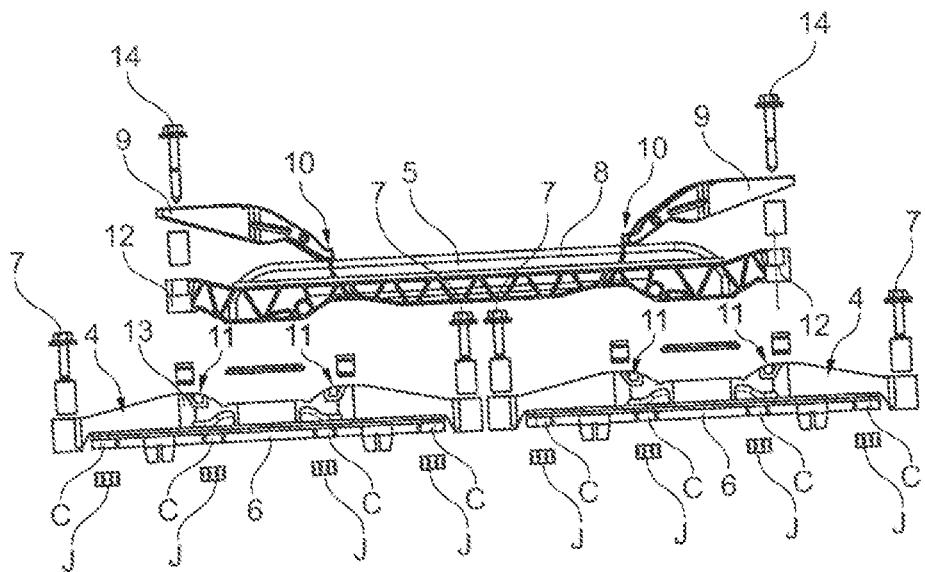
FIGS. 4*a* to 4*c* are lateral depictions of two base modules and a bridge, all according to the invention, in different assembly phases.

In the nonlimiting example depicted in FIGS. 4a to 4c, 5 and 6, the letter C denotes the four channels present in said base module. In FIG. 4a, seals J intended to provide sealing at the junctions between said channels C and the channels 2 in said floor are also shown. These seals J are obviously likewise present in the embodiments of the other figures but are not expressly denoted for greater clarity. By way of example, the floor, in particular the extruded floor, may have a thickness of 14 mm and the wall of each channel cannot then exceed a thickness of several millimeters, for example 2 mm. Each seal J thus bears on a very thin profile. In order to withstand deformations of the seals J, which would have a detrimental effect on the leaktightness of the assembly, the seals advantageously have a high ratio between their heights and widths. Each seal is advantageously received in a groove formed in the base module 4, in the floor or formed partially in the base module 4 and partially in the floor.

Figure 4B:
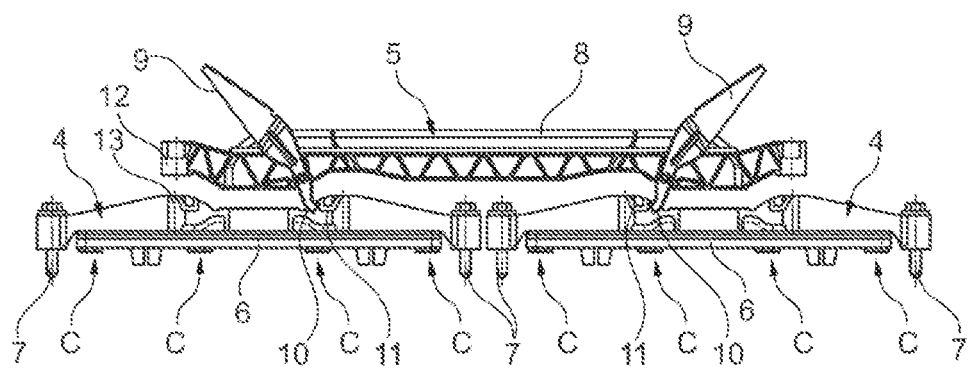
Figure 4C:
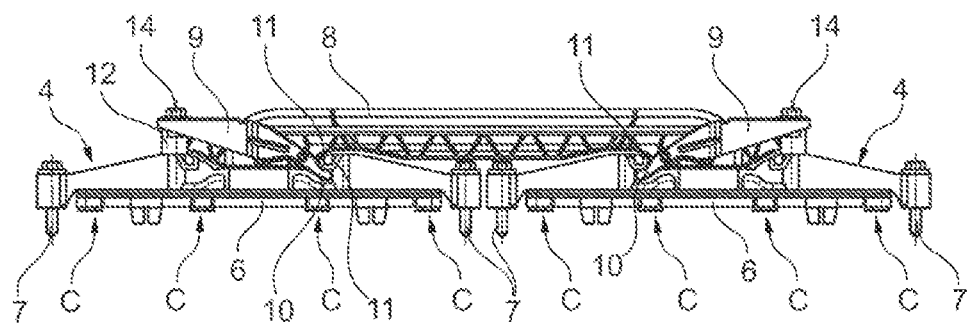
Figure 5:
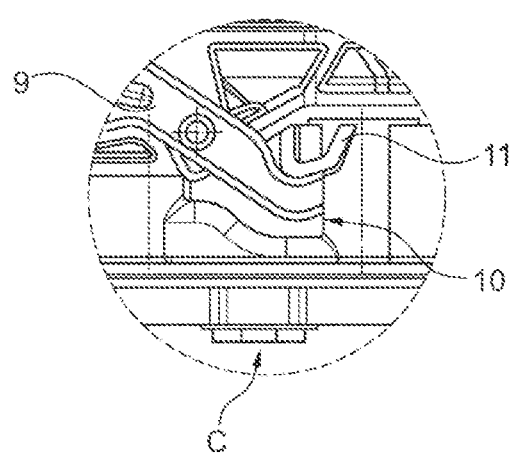
FIG. 5 is a partial enlargement of a connection zone in FIG. 4*c*.
Figure 6:
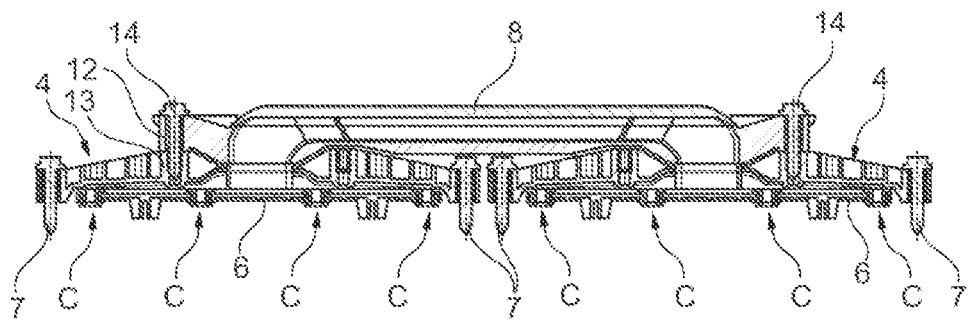
FIG. 6 is a depiction of a longitudinal section in a median plane of the assembly according to the invention illustrated in FIG. 4*c*.
Figure 7:
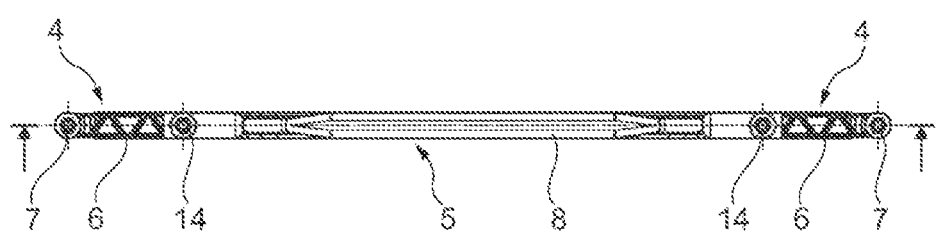
FIG. 7 is a schematic top view of the assembly according to the invention illustrated in FIG. 4*c*.

In order to ensure the setup shown in particular in FIGS. 4a to 4c, the assembly according to the invention is also characterized in that each base module 4 has at least two fastening screws 7, preferably (exactly) two fastening screws 7, for fastening them to said floor, said fastening screws 7 being disposed in the vicinity of the ends of each base module 4.

In order for it to be possible to form the desired circuit for the heat transfer fluid, it is necessary, as indicated schematically in FIG. 2, to connect the various mutually adjacent base modules 4 together by way of bridges 5, which then form loops.

According to the present invention, the abovementioned modular assembly is characterized in that each bridge 5 is made in the form of an elongate spacer 8 for fluidically connecting two adjacent base modules 4 and having at least two pivoting levers 9 which are provided, at their lower ends, with hooks 10 that engage at their bottoms with corresponding protrusions 11 disposed on the base modules 4 to be connected and which are provided, at their opposite ends, with fastening points 12 that face corresponding fastening points 13 situated on the base modules 4, said fastening points 12, 13 being able to take a screw for screwing them together when said pivoting levers 9 are lowered and engaged with the protrusions 11 of the base modules 4 to be connected.

To this end, the levers 9 are provided with through-orifices for the screws 14 that make the connection between the bridge 5 and the base module 4 to pass through.

The casing 1 may be made for example of metal or of a rigid material of low thermal conductivity, such as a synthetic or plastics material. It is formed, for the one part, by a lower tray with a bottom wall and side walls assembled at the periphery, preferably by screwing, and optionally with an interposed seal (cf. FIG. 1).

Advantageously, an embodiment of the casing 1 made of rigid plastics material (thermoplastic material filled or not filled with additives and/or fibers, for example polypropylene, polyamide, polyester, etc.) and of two parts assembled at the periphery makes it possible to achieve at the same time (compared with metal casings) better thermal insulation and a reduction in manufacturing costs, and allows a wide variety and diversity of forms that can be produced.

Advantageously, the assembly according to the invention is therefore also characterized in that all of the constituent elements thereof are made from one or more plastics materials, and in that the thickness of said assembly is less than that of the extruded floor.

Preferably, said modular assembly is characterized in that its thickness is less than 14 mm.

According to another feature, the modules (3, 3') are fluidically connected to distribution/collection lines that are part of a heat transfer fluid feed/discharge circuit. Furthermore, a conventional means for controlling the temperature, the circulation and/or the distribution of the heat transfer fluid can be structurally, or materially, incorporated at least partially in the casing 1, for example in the form of partial incorporation of a water pump (not shown).

Finally, a further subject of the present invention is a motor vehicle, in particular an electric or hybrid motor vehicle, characterized in that it comprises at least one assembly according to the present invention.

In a conventional manner, said motor vehicle therefore comprises at least one battery unit as described above, this battery unit also having at least one internal temperature measurement means, means for electrically connecting the cells or other elements together, and exterior connection means, the latter advantageously being partially formed with or in a wall of the casing 1.

Of course, the invention is not limited to the embodiments described and shown in the appended drawings. Modifications remain possible, in particular from the point of view of the makeup of the various elements or by substitution of equivalent techniques, without otherwise departing from the scope of protection of the invention.

The invention claimed is:

1. A modular assembly for an inlet, circulation and outlet of a heat transfer fluid, in a battery unit for a hybrid or electric motor vehicle having at least one such unit, said at least one battery unit being accommodated in a casing having a floor in which mutually parallel and rectilinear channels are arranged that receive said fluid, said casing comprising:
   a module serving as inlet and an identical module serving as outlet for said heat transfer fluid to and from, respectively, the circuit of channels via in each case a base module, each base module comprising a system of substantially rectilinear and parallel channels facing the ends of the channels in said floor, such that the channels of the base module in each case butt in a leaktight manner against said ends, said base modules being fastened to said floor,
   a plurality of base modules distributed along each of the two faces of the floor and facing the ends of the channels in said floor, such that the channels of the base module in each case butt in a leaktight manner against said ends, said base modules being fastened to said floor, and
   a plurality of bridges fluidically connecting two adjacent base modules situated on one and the same side of said floor together and two base modules situated on the opposite side of the casing together with an offset so as to form a U-shaped or serpentine heat transfer fluid circuit between the two opposite faces of said casing, if necessary along the entire length of the latter,
   each base module being made in the form of an elongate bar having at least two channels in leaktight engagement with a corresponding number of channels situated in the floor of said casing,
   wherein each bridge is made in the form of an elongate spacer for fluidically connecting two adjacent base modules and having at least two pivoting levers which are provided, at their lower ends, with hooks that engage at their bottoms with corresponding protrusions disposed on the base modules to be connected and which are provided, at their opposite ends, with fastening points that face corresponding fastening points situated on the base modules, said fastening points being able to take a screw for screwing them together when said pivoting levers are lowered and engaged with the protrusions of the base modules to be connected.

2. The assembly as claimed in claim 1, wherein the modules serving as inlet and outlet are made in the form of ducts fastened in a leaktight manner by screwing, with fluidic communication to said base modules.

3. The assembly as claimed in claim 1, wherein said assembly comprises exactly one module serving as inlet and one identical module serving as outlet, and in that these modules are disposed on the same side of the casing.

4. The assembly as claimed in claim 1, wherein each base module has at least two fastening screws for fastening them to said floor, said fastening screws being disposed in the vicinity of the ends of each base module.

5. The assembly as claimed in claim 1, wherein all of the constituent elements thereof are made from one or more plastics materials, and in that the thickness of said assembly is less than that of the floor.

6. The assembly as claimed in claim 5, wherein the thickness is less than 14 mm.

7. The assembly as claimed in claim 1, wherein the modules are fluidically connected to distribution/collection lines that are part of a heat transfer fluid feed/discharge circuit.

8. A motor vehicle, in particular an electric or hybrid motor vehicle, wherein said motor vehicle comprises at least one assembly as claimed in claim 1.

9. The assembly as claimed in claim 2, wherein the modules serving as inlet and outlet are made in the form of ducts fastened in a leaktight manner by screwing with the aid of two screws for each module, with fluidic communication to said base modules.

10. The assembly as claimed in claim 4, wherein each base module has two fastening screws-for fastening them to said floor, said fastening screws being disposed in the vicinity of the ends of each base module.

* * * * *